(No Model.)

F. E. LEVANSELER.
BELT HOLDER.

No. 565,473.  Patented Aug. 11, 1896.

Witnesses
Thomas H. Stewart
Levi F. Cox

Inventor:
Frank E. Levanseler,
By Lucius C. West
Attorneys.

THE NORRIS PETERS CO., PHOTO-LITHO., WASHINGTON, D. C.

United States Patent Office.

FRANK E. LEVANSELER, OF STURGIS, MICHIGAN.

BELT-HOLDER.

SPECIFICATION forming part of Letters Patent No. 565,473, dated August 11, 1896.

Application filed September 10, 1894. Serial No. 522,586. (No model.)

*To all whom it may concern:*

Be it known that I, FRANK E. LEVANSELER, a citizen of the United States of America, residing in the village of Sturgis, county of St. Joseph, and State of Michigan, have invented a new and useful Belt-Holder, of which the following is a specification.

This invention relates to that class of belt-holders which have roller-bearings between a non-revolving body and a revolving rim, said body being supported in such a position that its revoluble rim will be by the side of a live-pulley, so that the belt can be shifted from one pulley to the other.

The object of the invention is to facilitate the shifting of the belt from the live-pulley to the dead-pulley and vice versa by means of a construction for moving the non-revolving-body toward the live-pulley, and through the medium of the loose rollers moving the revolving rim into contact with the live-pulley, so as to partake of its motion and thus be ready for shifting the belt, all as more particularly set forth and claimed below.

Figure 1:
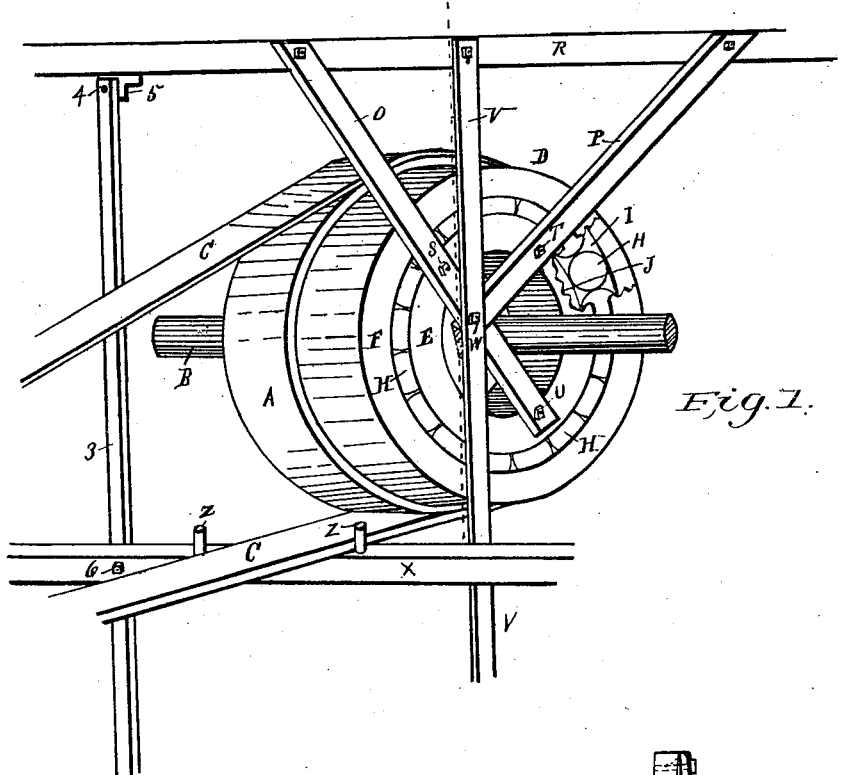
Figure 2:
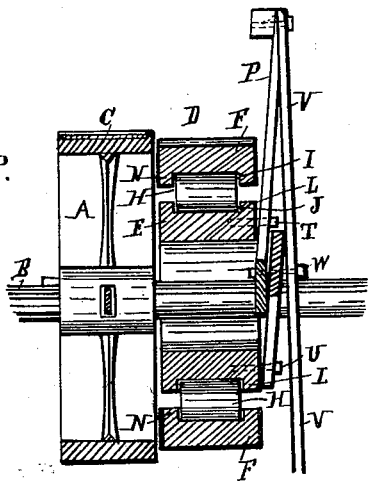

In the drawings forming a part of this specification, Figure 1 is a perspective view of the pulleys; and Fig. 2 is a vertical section on dotted line in Fig. 1, looking from a point at the right.

Referring to the lettered parts of the drawings, A is a live-pulley on the line-shaft B, and C is a belt on said pulley.

The dead-pulley D, which serves as a belt-holder when the machinery being driven by said belt is at rest, is located by the side of the live-pulley A, in the ordinary manner. This dead-pulley D is separated a little from the live-pulley A, is a little smaller than said live-pulley, surrounds the line-shaft B, and is entirely disconnected therefrom. The dead-pulley D is composed of a non-revoluble body E and outer rim F, separated therefrom and concentric therewith, and roller-bearings H, between said body E and rim F. This rim F is provided with an interior channel I, and the body has a like peripheral channel J, and in these channels I J the rollers H are loosely placed, as many being employed as is necessary to fill said channels, Fig. 1; but so far as the shape of these rollers and channels is concerned any style may be followed which is deemed the most preferable.

The object of the rollers is of course to lessen friction, causing the rim to run easier and longer, and thus allow the belt to come to a gradual rest, and, since said rollers H are loose in flanged channels, when the body E is moved toward the live-pulley A the flange L of the channel J of said body comes in contact with the outer end of the rollers H, which slides said rollers endwise, their inner ends coming in contact with the flange N of the rim F, and this action moves the rim F into contact with the live-pulley A, which pulley being under motion imparts its revolving motion to the revoluble rim. In order for the rim F to contact with the live-pulley A, and not have the non-revoluble body come into contact with said rim, the rim must exceed in width the width of the body, or at least the inner face of the rim must be nearer the live-pulley than is the inner face of said body, Fig. 2.

The body E of the dead-pulley D is supported in its proper position by elastic hangers, which hangers consist of elastic bars O P, said bars being attached at their upper ends to a beam R, above the pulleys, and thence extending divergingly downward and attached to the body by bolts S T U. The hanger further consists of an elastic handle-bar V, which is also attached to the beam R, and extends downward to a point where it can be reached. This handle-bar V is here shown broken, and it is attached to the elastic bars O P, where it crosses them, by bolt W. This handle-bar V is for moving the dead-pulley D toward the live-pulley A by springing it and the elastic bars toward said live-pulley. Since this action is against a spring-resistance, the elastic bars O P and handle-bar V will spring back to place when released, thus moving the dead-pulley back to its normal position and holding it there.

At X is a horizontal sliding-bar, here shown broken at the ends, said sliding-bar being provided with projections Z Z, one each side of the belt C, to crowd against said belt in shifting the same from one pulley to the other.

A lever for operating the sliding shifting-bar X is shown at 3, pivoted at its upper end, at 4, to a bracket 5, attached to beam R, and is pivoted at 6 to the shifting-bar X. By means of this lever 3 the belt is shifted with one hand of the operator as soon as he has brought the live and dead pulleys into contact with the other hand grasping the handle-bar V.

Having thus described my invention, what I claim as new, and desire to secure by Letters Patent of the United States, is—

1. In combination with a live-pulley, the non-revoluble body of a dead-pulley provided with the peripheral channel, an elastic hanger supporting said body, a handle-bar attached to said elastic hanger, an outer revoluble rim concentric with the body and internally channeled, and rollers loose in said channels, substantially as set forth.

2. A dead-pulley, comprising the non-revoluble body having the peripheral channel, the elastic hanger supporting said body, a handle-bar attached to said hanger, the outer internally-channeled revoluble rim, and rollers in said channels, substantially as set forth.

3. In combination with a live-pulley, the non-revoluble body of a dead-pulley provided with the peripheral channel, an elastic hanger supporting said body, and a handle-bar attached to said hanger, the outer channeled rim, rollers in said channels, the slidable bar having the projections at the sides of the belt, and the lever for operating said bar pendent in position to be operated by one hand of the operator while he operates the handle-bar of the hanger with the other hand, substantially as set forth.

4. In combination with a live-pulley, the non-revoluble body of a dead-pulley provided with the peripheral channel, an elastic hanger supporting said body, and a handle-bar attached to said hanger, the outer channeled rim, rollers in said channels, the inner face of the rim being nearer to the live-pulley than is the inner face of the non-revoluble body, substantially as set forth.

5. The combination of a live-pulley, a non-revoluble body, having the peripheral channel, an outer internally-channeled rim, rollers loose in said channels, and means for moving the rim into and out of contact with the live-pulley, substantially as set forth.

FRANK E. LEVANSELER.

Witnesses:
W. M. CONOVER,
LEVANT E. WHITE.